United States Patent
Prause

(10) Patent No.: US 10,742,317 B2
(45) Date of Patent: *Aug. 11, 2020

(54) OPTICAL NETWORK TEST INSTRUMENT INCLUDING OPTICAL NETWORK UNIT IDENTIFIER CAPTURE CAPABILITY FROM DOWNSTREAM SIGNALS

(71) Applicant: VIAVI SOLUTIONS DEUTSCHLAND GMBH, Eningen unter Achalm (DE)

(72) Inventor: Dominik Prause, Reutlingen (DE)

(73) Assignee: VIAVI SOLUTIONS DEUTSCHLAND GMBH, Eningen unter Achalm (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,238

(22) Filed: May 4, 2017

(65) Prior Publication Data

US 2017/0338888 A1    Nov. 23, 2017

Related U.S. Application Data

(63) Continuation of application No. 14/788,116, filed on Jun. 30, 2015, now Pat. No. 9,673,897.

(51) Int. Cl.
*H04B 10/079*    (2013.01)
*H04Q 11/00*    (2006.01)
(Continued)

(52) U.S. Cl.
CPC ....... *H04B 10/0793* (2013.01); *G01M 11/335* (2013.01); *H04B 10/07* (2013.01);
(Continued)

(58) Field of Classification Search
CPC ..... H04J 3/14; H04J 2203/0062; H04L 43/50; H04L 12/2697; H04B 10/079;
(Continued)

(56) References Cited

U.S. PATENT DOCUMENTS 8,068,729 B2    11/2011    Tanaka
8,213,002 B2    7/2012    Kassler et al.
(Continued)

FOREIGN PATENT DOCUMENTS

CN    102752211    10/2012
CN    102752211 B    12/2014
(Continued)

OTHER PUBLICATIONS

"Gigabit-capable Passive Optical Networks (G-PON): Transmission convergence layer specification; G.984.3 (Mar. 2008)" ITU-T Standard, International Telecommunication Union, Geneva; pp. 1-146 Mar. 29, 2008 (retrieved on Apr. 24, 2009).
(Continued)

*Primary Examiner* — Mina M Shalaby
(74) *Attorney, Agent, or Firm* — Mannava & Kang, P.C.

(57) ABSTRACT

A test instrument can be coupled to a test point in a passive optical network to measure optical signals transmitted between an optical line terminal and an optical network unit in the optical network. The test instrument can capture an identifier of the ONU from downstream signals sent from the OLT to the ONU.

21 Claims, 8 Drawing Sheets

(51) Int. Cl.
*H04B 10/07* (2013.01)
*G01M 11/00* (2006.01)

(52) U.S. Cl.
CPC ... *H04B 10/07955* (2013.01); *H04Q 11/0067* (2013.01); *H04Q 2011/0083* (2013.01)

(58) Field of Classification Search
CPC ............... H04B 10/07953; H04B 3/46; H04B 10/0795; H04B 10/07955; H04B 10/0793; H04Q 11/0067; H04Q 2011/0083
See application file for complete search history.

(56) References Cited

U.S. PATENT DOCUMENTS

| | | | | |
|---|---|---|---|---|
| 2005/0249498 A1* | 11/2005 | Haran | ...................... | H04L 47/13 398/58 |
| 2006/0007426 A1* | 1/2006 | Weller | ................. | H04B 10/071 356/73.1 |
| 2006/0171711 A1* | 8/2006 | Ruchet | ................. | H04B 10/079 398/9 |
| 2006/0198634 A1* | 9/2006 | Ofalt | ..................... | H04B 10/077 398/16 |
| 2007/0073508 A1* | 3/2007 | Taniguchi | ............... | H04L 12/66 702/122 |
| 2007/0242954 A1 | 10/2007 | Sackman | | |
| 2008/0187310 A1* | 8/2008 | Tanaka | ...................... | H04J 3/14 398/9 |
| 2008/0292314 A1* | 11/2008 | Lu | ...................... | H04B 10/0773 398/58 |
| 2010/0316372 A1 | 12/2010 | Chang et al. | | |
| 2010/0316373 A1 | 12/2010 | Chang et al. | | |
| 2011/0129214 A1* | 6/2011 | Zheng | ................ | H04B 10/2504 398/27 |
| 2011/0141457 A1 | 6/2011 | Levin et al. | | |
| 2012/0128358 A1* | 5/2012 | Zhang | ................ | H04B 10/0773 398/63 |
| 2012/0275782 A1* | 11/2012 | Rapp | .................... | H04B 10/272 398/25 |
| 2012/0288273 A1* | 11/2012 | Pohlmann | .......... | H04Q 11/0067 398/9 |
| 2013/0177314 A1* | 7/2013 | Mizuguchi | ............ | H04J 3/0655 398/66 |
| 2013/0202290 A1 | 8/2013 | Dvir | | |
| 2013/0259469 A1* | 10/2013 | Smith | ................. | H04J 14/0227 398/16 |
| 2013/0336655 A1* | 12/2013 | Grobe | ................. | H04J 14/0246 398/67 |
| 2014/0016926 A1* | 1/2014 | Soto | ................... | H04B 10/0775 398/16 |
| 2014/0269867 A1* | 9/2014 | Meller | ..................... | H04B 3/46 375/224 |
| 2014/0376911 A1* | 12/2014 | Treyer | ..................... | H04B 3/23 398/48 |
| 2015/0043908 A1* | 2/2015 | Prause | ............. | H04B 10/07955 398/34 |
| 2016/0087748 A1* | 3/2016 | Khotimsky | .......... | H04B 10/272 398/67 |

FOREIGN PATENT DOCUMENTS

| | | |
|---|---|---|
| EP | 1965517 | 9/2008 |
| EP | 2690802 A1 | 1/2014 |
| EP | 2846479 A1 | 3/2015 |
| WO | 2005036783 | 4/2005 |
| WO | 2012127091 | 9/2012 |

OTHER PUBLICATIONS

EP 14180105 Search Report dated Jan. 30, 2015.
JDSU OLP-57 Smart Optical Power Meter Product Sheet; Downloaded from http://www.testequipmentdepot.com/ on Aug. 4, 2014, 4 pages.
International Telecommunication Union ITU-T G.983 series Series G: Transmissions Systems and Media, Digital Systems and Networks Papers and amendments published between Mar. 2001 and Jul. 2005.
International Telecommunication Union ITU-T G.984 series Series G: Transmissions Systems and Media, Digital Systems and Networks Papers and amendments published between Mar. 2003 and May 2012.
International Telecommunication Union ITU-T G.987 series Series G: Transmissions Systems and Media, Digital Systems and Networks Papers and amendments published Feb. 2012.
IEEE 802.3ah—IEEE Standard for Information Technology—Telecommunications and information exchange between systems—Local and Metropolitan area Networks-Specific requirements—Part 3: Carrier Sense Multiple Access with collision Detection (CSMA/CD) Access Method and Physical Layer Specifications Amendment: Media Access Control Parameters, Physical Layers and Management Parameters for Subscriber Access Networks—Sep. 7, 2004, 320 pages. pages.
IEEE 802.3av—IEEE Standard for Information Technology—Telecommunications and information exchange between systems—Local and Metropolitan area Networks-Specific requirements—Part 3: Carrier Sense Multiple Access with collision Detection (CSMA/CD) Access Method and Physical Layer Specifications Amendment 1: Physical Layer Specification and Management Parameters for 10 Gb/s Passive Optical Networks—Oct. 30, 2009, 236 pages.

* cited by examiner

| Assign_ONU-ID message |||
|---|---|---|
| Octet | Content | Description |
| 1 | 11111111 | Broadcast message to all ONUs. |
| 2 | 00000011 | Message identification "Assign_ONU-ID". |
| 3 | pppppppp | ONU-ID. |
| 4 | abcdefgh | Serial number byte 1. |
| 5-10 | ..... | |
| 11 | stuvwxyz | Serial number byte 8 |
| 12 | Unspecified | |

FIG. 6

OPTICAL NETWORK TEST INSTRUMENT INCLUDING OPTICAL NETWORK UNIT IDENTIFIER CAPTURE CAPABILITY FROM DOWNSTREAM SIGNALS

BACKGROUND

Optical networks encode signals onto light to transmit information to its destination via fiber optic cables. Optical networks have become extremely popular because of their high bandwidth capabilities, and are often used by service providers for delivering services, such as cable television, high-speed Internet, telephone, etc., to customers. Traditionally, fiber optic networks were used in a portion of the network, and other communication mediums were used to connect the customer premises to the network. Recently, network service providers have been installing fiber optic cables all the way to the customer premises, allowing for better quality of service.

One type of optical network is a passive optical network. A passive optical network uses optical splitters and couplers to separate signals and deliver the signals to their proper destinations. Commonly, a passive optical network includes a central optical line terminal (OLT) that is connected with a plurality of optical network units (ONUs) via an optical distribution network (ODN) including optical fibers connected by optical splitters and couplers. A single OLT may communicate with multiple ONUs in a point-to-multipoint configuration. The OLT may broadcast downstream signals to the ONUs, and organize upstream communication from the ONUs to the OLT using time-domain multiple access (TDMA).

Technicians servicing passive optical networks may travel to various locations of the ODN, and check optical power levels at those locations, to ensure that optical signals are propagating to their destinations with acceptable optical loss. Both average optical power levels and peak optical power levels may be measured and recorded and compared against thresholds to determine whether the power levels of the optical signals are within acceptable tolerances.

BRIEF DESCRIPTION OF DRAWINGS

Features of the present disclosure are illustrated by way of examples shown in the following figures. In the following figures, like numerals indicate like elements, in which:

FIG. 6 illustrates bytes of an Assign_ONU-ID message.

DETAILED DESCRIPTION

Figure 1:
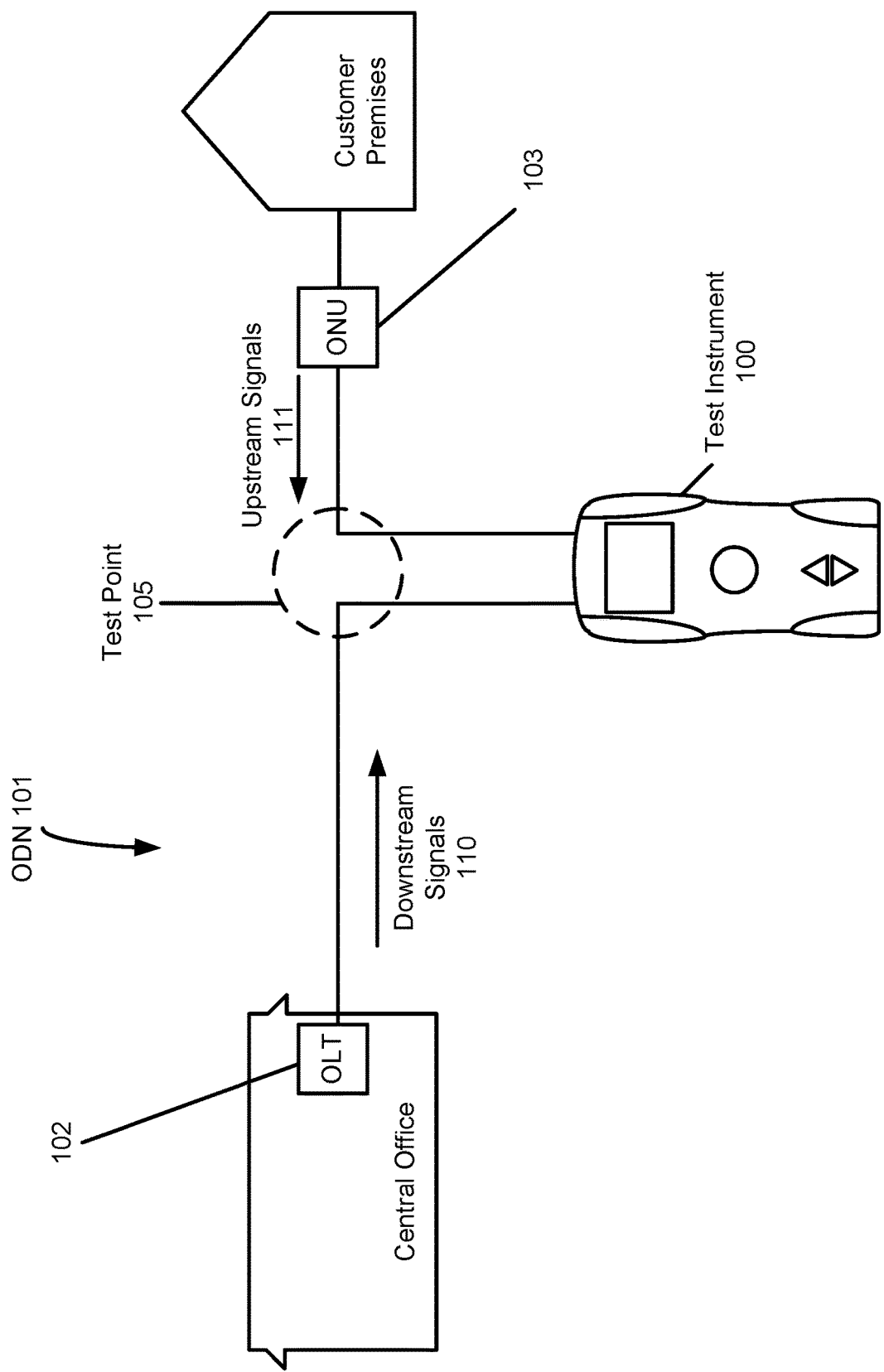
FIG. 1 illustrates an optical network with a test instrument connected at a test point, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A test instrument for optical networks may be connected to the optical network to measure parameters of optical signals transmitted in the optical network. The test instrument may also capture parameters of devices connected to the optical network, including device identifiers, from optical signals received by the test instrument. The optical signals for example include downstream signals transmitted from a service provider end point towards customer premises in the optical network. A test instrument is an apparatus that can connect to an optical network and can determine information about devices connected to the optical network and/or information about optical signals transmitted in the optical network.

In an example, the test instrument may be connected to a passive optical network (PON). For example, the test instrument may be connect to a test point in an optical distribution network (ODN) of the PON. The test point may be between an optical line terminal (OLT) and one or more optical network units (ONUs). The OLT may be is a service provider endpoint in the PON that sends downstream optical signals to the ONUs which may be connected to customer premises. The test instrument can take measurements of the downstream optical signals, including power level measurements, and can also determine identifiers, such as serial numbers, of the ONUs from messages sent from the OLT to the ONUs. In an example, the messages sent from the OLT are messages captured during an activation procedure of the ONUs, which may be invoked by connecting the test instrument to the ODN at a test point between the OLT and ONUs. The test instrument may include a processor, display, and data storage to store and display measurements, bytes captured from the downstream signals, including ONU identifiers, and other information. The test instrument may include a network interface, such as WiFi, Bluetooth, Ethernet, etc., to connect the test instrument to other devices via a network, and to transmit the stored data to other devices or computers. In one example, the test instrument is a portable, hand-held device. In other examples, the test instrument may be part of a larger system.

Upstream optical signals may be sent from the ONUs to the OLT. The test instrument may take measurements of the upstream optical signals and may capture parameters of the ONUs or the OLT sent in messages in the upstream signals. However, capturing upstream signals sent from ONUs to the OLT is technically very challenging due to the bursty nature of the upstream signals. For example, the OLT broadcasts optical signals to the ONUs in continuous mode. However, for upstream signals, the ONUs typically transmit data in allocated time slots (e.g., using TDMA) so the signals from the ONUs do not converge. An ONU may transmit an upstream signal in burst mode in an allocated time slot. Due to variations in phase and amplitude, information in the burst mode upstream signals can be difficult to capture. Examples described herein may capture information, including ONU identifiers, from downstream signals, which may be broadcasted from the OLT, instead of burst mode upstream signals sent from the ONUs.

The test instrument may include a capture circuit to capture information from downstream signals at predetermined times to facilitate capture of information for a particular ONU during an activation process. For example, a capture circuit is to start and stop storing data from a downstream signal based on conditions derived from at least one of data patterns found in the downstream signal, a burst detector detecting an upstream signal transmitted from the ONU just prior to receiving the downstream signal, and signals from a processor which may indicate the ONU is in an activation process. Also, the test circuit may capture information for multiple ONUs at a single test point or connection point in the ODN if multiple ONUs are connected downstream from the test point.

The ONU identifiers determined from captured downstream signals may include ONU serial numbers and/or ONU IDs assigned by an OLT. An ONU serial number may be a unique identifier assigned by a manufacturer or another entity and typically does not change. An ONU ID assigned by an OLT may be unique to a set of ONUs that are currently determined by the OLT to be connected to the OLT. If an ONU is disconnected and then re-connected, the OLT may assign a new ONU ID to the ONU. Determining the ONU identifiers may be used for debugging transmission problems in the ODN and for determining which ONUs are currently connected to the ODN.

The test instrument may be used with any suitable type of optical network, including different types of PONs, such as GPON, XG-PON, EPON, 10G-EPON, etc. Some examples of the test instrument are described below with respect to GPON and protocol messages exchanged during an ONU activation process for GPON as described in the ITU-T G.984 communications standard. However, the test instrument may be used in optical networks employing other standards.

FIG. 1 illustrates a test instrument 100 connected to an optical network. The test instrument 100 may be connected between a service provider end point and a node in the network. For example, as shown in FIG. 1, the test instrument 100 is connected to test point 105 in an ODN 101 of a PON. The ODN 101 carries bidirectional traffic. The test point 105 is between OLT 102, which may be located at a central office of a service provider, and ONU 103, which may be located at or near a customer premises. Although not shown, the PON may include multiple ONUs, which is further described with respect to FIG. 2.

To connect the test instrument 100 at the test point 105 shown in FIG. 1, optical fibers of the ODN 101 are disconnected at the test point 105, and the test instrument 100 is inserted by coupling optical ports of the test instrument 100 to the disconnected optical fibers. In this manner, downstream signals 110 from the OLT 102 to ONU 103 flow through the test instrument 100. Also, upstream signals 111 from the ONU 103 to the OLT 102 also flow through the test instrument 100. The test instrument 100 may capture information from the downstream signals 110, including ONU identifiers, and measure power and other parameters of the downstream signals 110 and the upstream signals 111.

A downstream signal, which is an optical signal transmitted in the ODN 101, includes signals sent from the OLT to ONUs. For example, the OLT 102 may broadcast the downstream signals 110 to one or multiple ONUs simultaneously. The downstream signals may carry broadcast data, such as, for example, television data for a cable service provider, as well as data intended to individual ONUs, which may include identification data to identify intended recipients. An upstream signal, which is an optical signal transmitted in the ODN 101, includes signals sent from ONUs to an OLT. Upstream signals are commonly organized using TDMA. For example, the upstream signals 111 may be sent in time slots assigned by the OLT 102. Different frequencies may be used to transmit downstream and upstream signals. By way of example, the downstream signals 110 may be transmitted at wavelengths of 1490 nanometers (nm)±10 nm and/or 1550 nm±10 nm, and the upstream signals 111 may use wavelengths of 1270 nm±10 nm and/or 1310 nm±10 nm.

The terms optical network unit or ONU and optical network terminal or ONT are used interchangeably herein, because they perform similar operations according to the examples described herein. ONUs are usually deployed near a group of customer premises or "at a curb", whereas ONTs are usually deployed at individual customer premises. For simplicity, the term ONU denotes both ONU and ONT.

Figure 2:
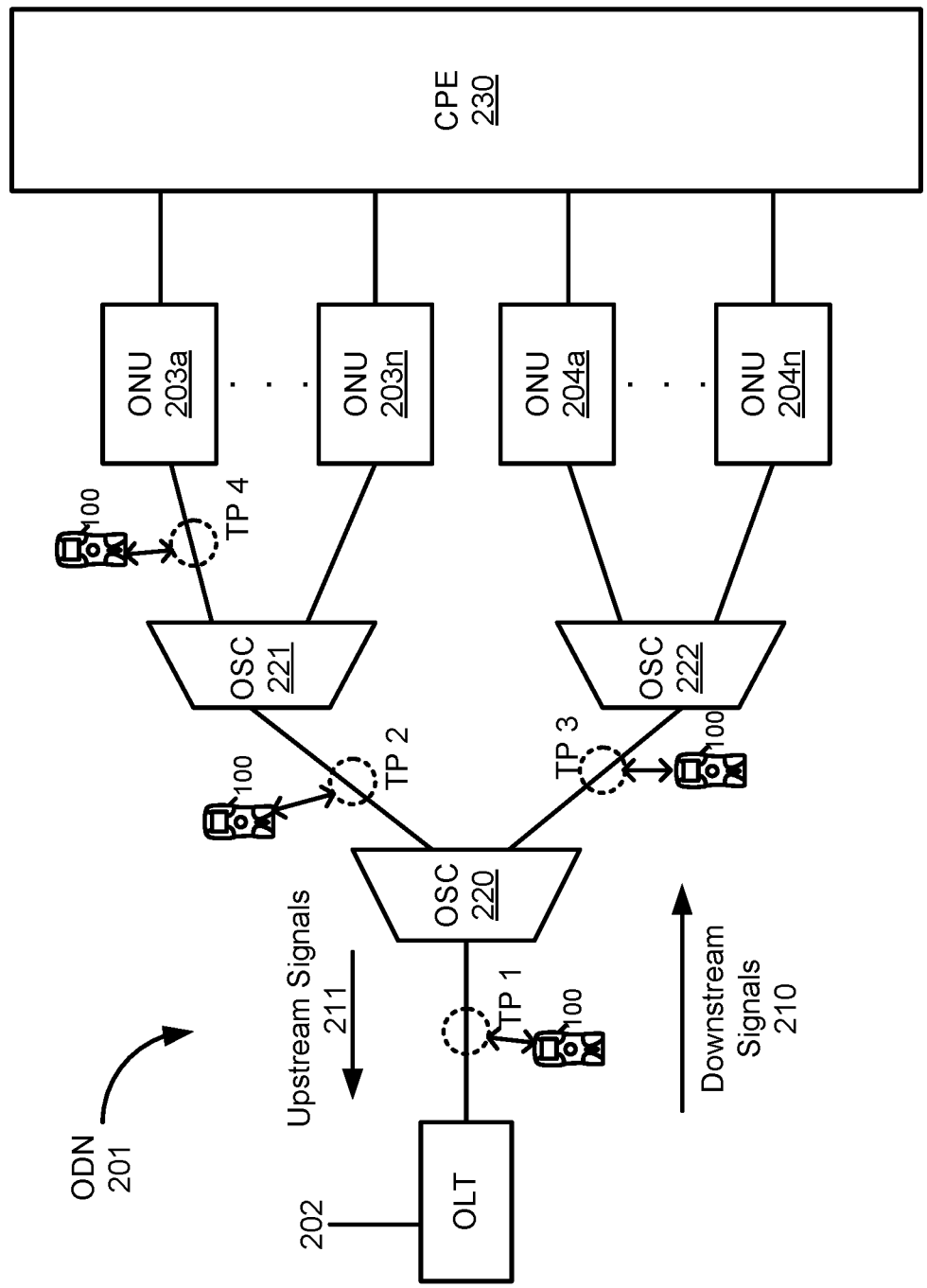
FIG. 2 illustrates multiple test points in an optical distribution network, according to an example of the present disclosure.

The test instrument 100 may be deployed in an optical network that includes a PON. A PON may use unpowered optical splitters to enable a single optical fiber to serve multiple customer premises. FIG. 2 shows an example of an ODN 201 with a point-to-multipoint configuration and including optical power splitters/combiners (OSCs) 220-222. The test instrument 100 may connect at different test points (e.g., TP1-4) in the ODN 201. The ODN 201 may include more than one OLT and may include more or less ONUs and OSCs than shown in FIG. 2 and may be connected in hierarchal configurations other than shown in FIG. 2.

The ODN 201 carries bidirectional optical traffic between the OLT 202 and ONUs 203a-n and 204a-n. Downstream signals 210, may be broadcasted by the OLT 202 to the ONUs 203a-n and 204a-n and may carry data intended for all the ONUs or individual ONUs. The downstream signals 210 are power divided by the OSCs 220-222. For example, each of the OSCs 220-222 power-divides the downstream signals 210 equally between its output legs. The OLT 202 may be connected to another network, e.g. an Ethernet network, which serves as an external source and recipient of communications.

ONUs 203a-n and 204a-n may be connected to customer premises equipment 230 located at multiple customer premises and/or may be connected to other networks. For example, the ONUs 203a-n and 204a-n may be connected to respective subscriber networks or subscriber devices, which may be a source of payload data transmitted in the ODN 201 from the subscriber/customer premises side. Upstream signals 211 from the ONUs 203a-n and 204a-n may be organized using TDMA. For example, the OLT 202 operates as a "master", which assigns a time slot to each of the ONUs 203a-n and 204a-n, during which an upstream transmission may be performed. The OSCs 220-222 may combine all signals arriving at downstream facing ports into combined upstream signals, in which all of the upstream signal bursts from ONUs arrive properly separated in their time slots.

Examples of test points TP1-4 are shown. The test instrument 100 may be connected at any of the test points, and may capture downstream signals at any of these test points to determine ONU identifiers of downstream ONUs. For example, at TP4, an ONU identifier may be determined for ONU 203a, and at TP3, ONU identifiers may be determined for ONUs 204a-n from downstream signals. Also, optical signals received by the test instrument 100 at any of the test points may be measured to determine power levels, loss, and other information.

FIG. 3 shows the test instrument 100 according to an example. The test instrument 100 may include optical ports 1 and 2 connected to fiber optic cables in an ODN. For example, assume the test instrument 100 is connected to the test point 105 shown in FIG. 1, between OLT 102 and ONU 103. Optical ports 1 and 2 are connected to fiber optic cables in the ODN 101 at the test point 105. The test instrument 100 receives downstream signals 110 and upstream signals 111 via optical ports 1 and 2, respectively, and also passes through the signals (e.g., attenuated signals) towards their destination via an optical coupler 304, such as a 2×2 coupler.

The optical coupler 304 includes coupler port 331 and coupler port 332. The coupler port 331 is coupled to optical port 1, and coupler port 332 is coupled to optical port 2. The coupler ports 331 and 332 carry bidirectional optical traffic (e.g., downstream signals 110 and upstream signals 111) between optical ports 1 and 2. The optical coupler 304 further includes a drop port 341 for dropping a portion of the upstream signals 111 and a drop port 342 for dropping a portion of the downstream signals 110.

To drop portions of the downstream signals 110 and the upstream signals 111, the coupler 304 power splits the signals. For example, referring to downstream signals 110 received at optical port 1, the signals enter the coupler at coupler port 331 (shown as DS 100%). The coupler 304 power-splits the downstream signals 110. A major portion of the downstream signal power is output from the coupler port 332. For example, 80% of optical power of the downstream signals are passed to coupler port 332 (shown as DS 80%) and propagate to ONU 103 via optical port 2. A minor portion of the downstream signal power is output through the drop port 342. For example, twenty percent (20%) of the optical power of the downstream signals 110 (shown as DS 20%) are output through drop port 342 to downstream receiver 306. The 80/20 power split performed by the coupler 304 is an example, and the coupler 304 may be designed to perform other percentages of power split. The major portion of the signal power may be 3 to 4 times the minor portion. A similar operation may be performed for the upstream signals 111 to drop a portion of the upstream signals via drop port 341 to the upstream receiver 307.

The downstream receiver 306 may include a filter 311 to pass desired wavelengths, a photodetector 312 to convert the dropped portion of the downstream optical signals 110 to electric signals, a power meter 313 to measure power levels and loss, a clock data recovery (CDR) circuit 314 to recover clock data from the electrical signal fed to the capture circuit 320, and other components to perform other functions. The power meter 313 may measure peak and/or an average optical power, and may include amplifiers connected to a peak/average signal detector. Many types of amplifiers may be used. The test instrument 100 may include a user interface 321 to receive user input and to display information, such as power levels, loss, ONU identifiers, etc. For example, optical power level of the downstream traffic may be displayed together with the identification information of the ONU 103. The upstream receiver 307 may include similar components to the downstream receiver and other components as needed. The downstream and upstream receivers 306 and 307 may be referred to as optical receivers because they receive optical signals.

The coupling of the test instrument 100 to the test point 105 causes the ONU 103 to be disconnected and re-connected to the ODN 101. This initiates an activation or discovery procedure between the OLT 102 and the ONU 103 upon re-coupling of the ONU 103 to the ODN via the test instrument 100. The activation procedure may correspond to a communication standard used in a particular network. During the activation procedure, the ONU 103 may transmit its ONU identifier (e.g., ONU serial number) to the OLT 102 for example to announce its presence, and the OLT 102 may respond by transmitting a message that includes the ONU identifier it received from the ONU 103 and other information. The test instrument 100 captures the ONU identifier in the message transmitted in the downstream signal from the OLT 102 to the ONU. For example, the output of the downstream receiver 306 may include a digital data stream (e.g., bit stream) of bytes in the downstream signals 110. The capture circuit 320 captures the bytes of the downstream signals 110 during the activation procedure. The captured bytes include an identifier of the ONU 103. The capture circuit 320 extracts this information, thereby identifying the ONU 103, and stores this information in the data storage 351. The data storage 351 may store any information captured from the downstream signals 110 and upstream stream signals 111. The data storage 351 may store power level measurements or any other measurements taken by the test instrument 100. The stored information may be displayed and/or communicated via communications interface 322, such as WiFi, Ethernet, Bluetooth, USB, etc., to another device or system.

The capture circuit 320 starts and stops saving the bytes of the downstream signals 110 to the data storage 351. The conditions of when to start and stop saving the bytes may be derived from data patterns found in the data stream and may also utilize other signals, e.g., provided from burst detector 352 and/or provided from processor 350. The burst detector 352 generates a signal when an upstream signal burst (e.g., upstream signals 111) arrives at the test instrument 100. For example, the ONU 103 sends a message upstream to the OLT 102 during the activation period. The burst detector 352 detects the upstream signal and outputs a capture enable signal to the capture circuit 320, and the capture circuit 320 is enabled to capture and store the bytes of any subsequently received downstream signals 110 responsive to the capture enable signal. Accordingly, when the OLT 102 sends a response or acknowledgement to the received upstream message, the capture circuit 320 captures the information from the OLT message. If the capture enable signal is not set or is not output by the burst detector 352, the capture circuit 320 does not capture the bytes of the downstream signals 110. Because the OLT 102 may broadcast signals continuously and the signals may be received by all ONUs connected to the OLT 102, the capture enable signal minimizes opportunities to capture information for ONUs other than ONU 103 which may not be connected downstream of the test point 105. The test instrument 100, however, may operate without the burst detector 352 and the upstream receiver 307.

The processor 350 controls the test process and performs data processing on the captured data. The processor 350 may also display information via the user interface 321 and transmit/receive data via the communications interface 322. The processor 350 may also send signals to the capture circuit 320 to control the capture circuit 320 to start and stop capturing data from the downstream signals 110. For example, the processor 350 may enable the capture circuit 320 when it determines that the ONU 103 has entered the activation process. The hardware of the test instrument 100, including the processor 350, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and steps of the methods may be performed by the processor 350 or other hardware executing machine readable instructions stored in a non-transitory computer readable medium, such as the data storage 351, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

Figure 3A:
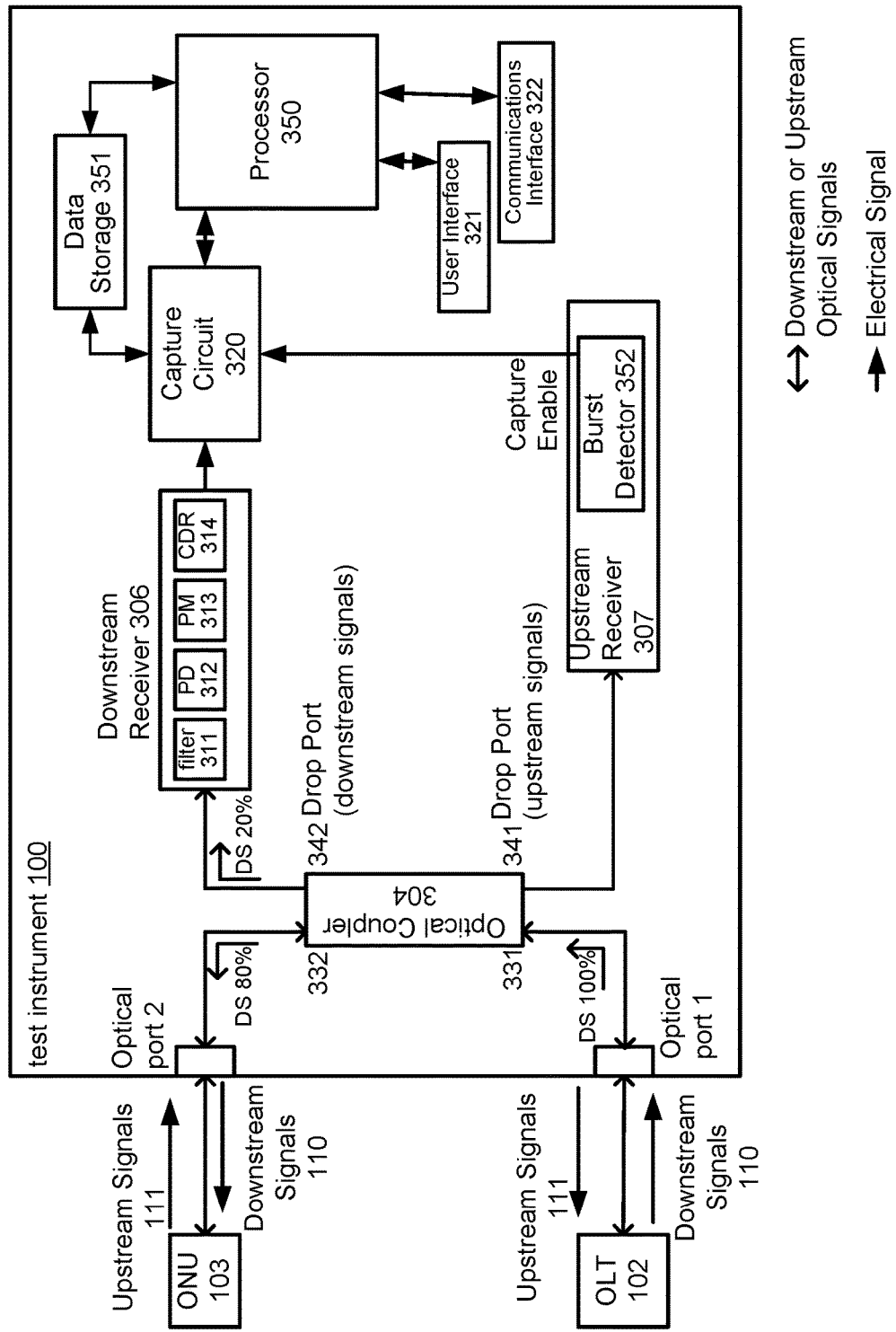
FIGS. 3A-B illustrate a test instrument, according to examples of the present disclosure.
Figure 3B:
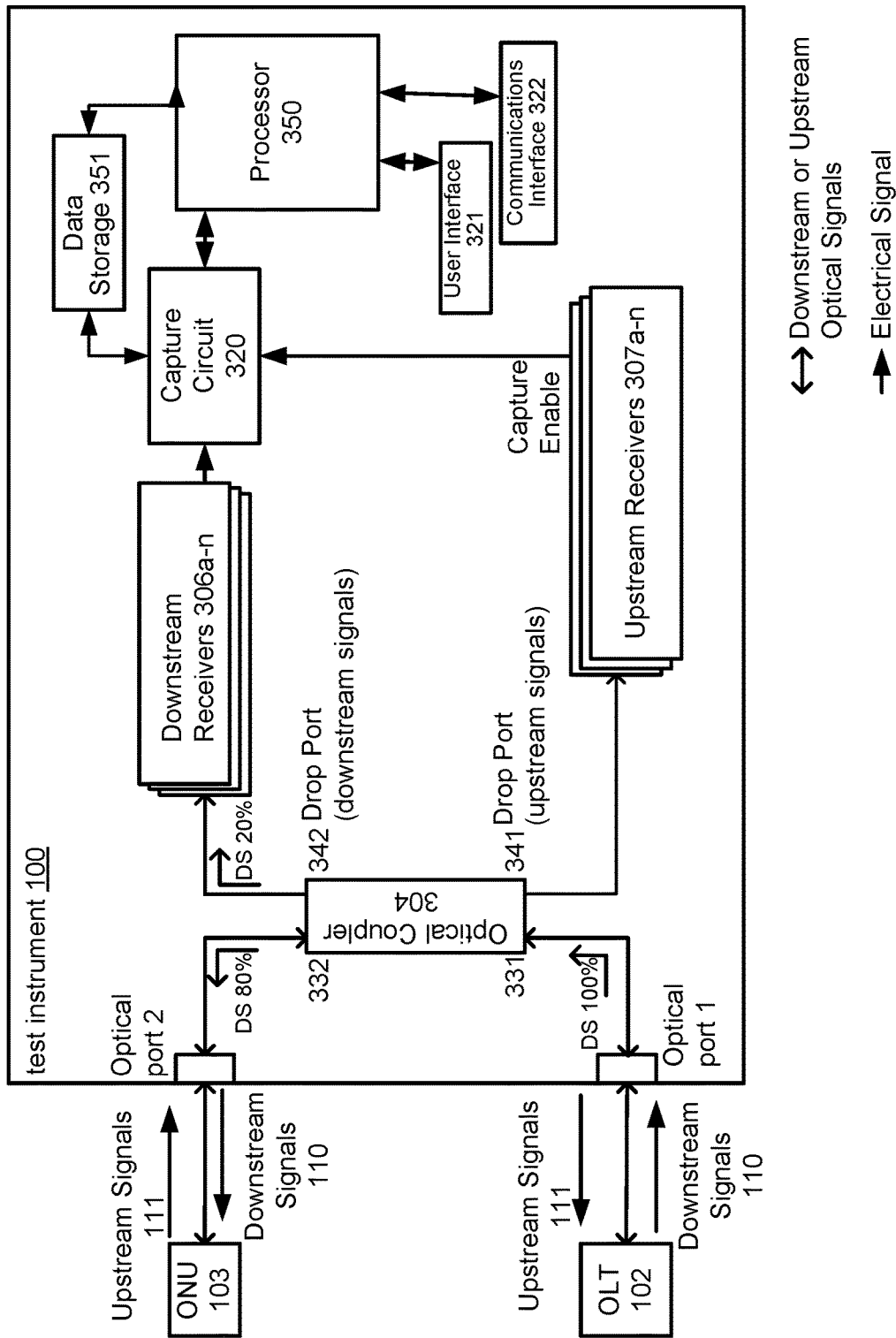

FIG. 3B shows an example of the test instrument 100 that is similar to as shown in FIG. 3A, except multiple downstream receivers 306a-n and multiple upstream receiver 307a-n are provided in the test instrument 100. Each of the downstream receivers 306a-n may include the components of the downstream receiver 306 shown in FIG. 3A, and each of the upstream receivers 307a-n may include the components of the upstream receiver 307 of FIG. 3A.

Sometimes different PON systems (e.g. G-PON, XG-PON, E-PON, etc.) operate over the same ODN. This is commonly referred to as an overlay scenario. FIG. 3B shows an example of the test instrument 100 whereby the test instrument 100 is capable of testing different PON systems. Different PON systems generally use different wavelengths for downstream and upstream signals and may have different data rates. Each of the downstream receivers 306a-n and upstream receivers 307a-n is used for a particular PON system. For example, the filters in each of the downstream receivers 306a-n and upstream receivers 307a-n pass the wavelengths of the corresponding PON system, so the optical signals for a particular PON system are received, measured and converted to electrical signals by its corresponding receiver. The downstream receivers 306a-n and upstream receivers 307a-n may be coupled to the same capture circuit 320 or may be coupled to separate capture circuits to capture information from the downstream signals 110, including the identifiers of the ONUs in the particular PON system that are downstream from the test point. The downstream signals 110 for example include signals for different PON systems. Each pair of receivers may be for a different PON system. For example, receivers 306a and 307a are for receiving G-PON signals, receivers 306b and 307b are for receiving XG-PON, etc. The capture circuit 320 (or multiple capture circuits if a capture circuit is provided for each PON system) captures ONU identifiers and other information for each PON system and stores it in the data storage 351. Any suitable number of downstream and upstream receivers may be provided in the test instrument 100, and may be based on the number of different PON systems that may be implemented on an ODN.

Figure 4:
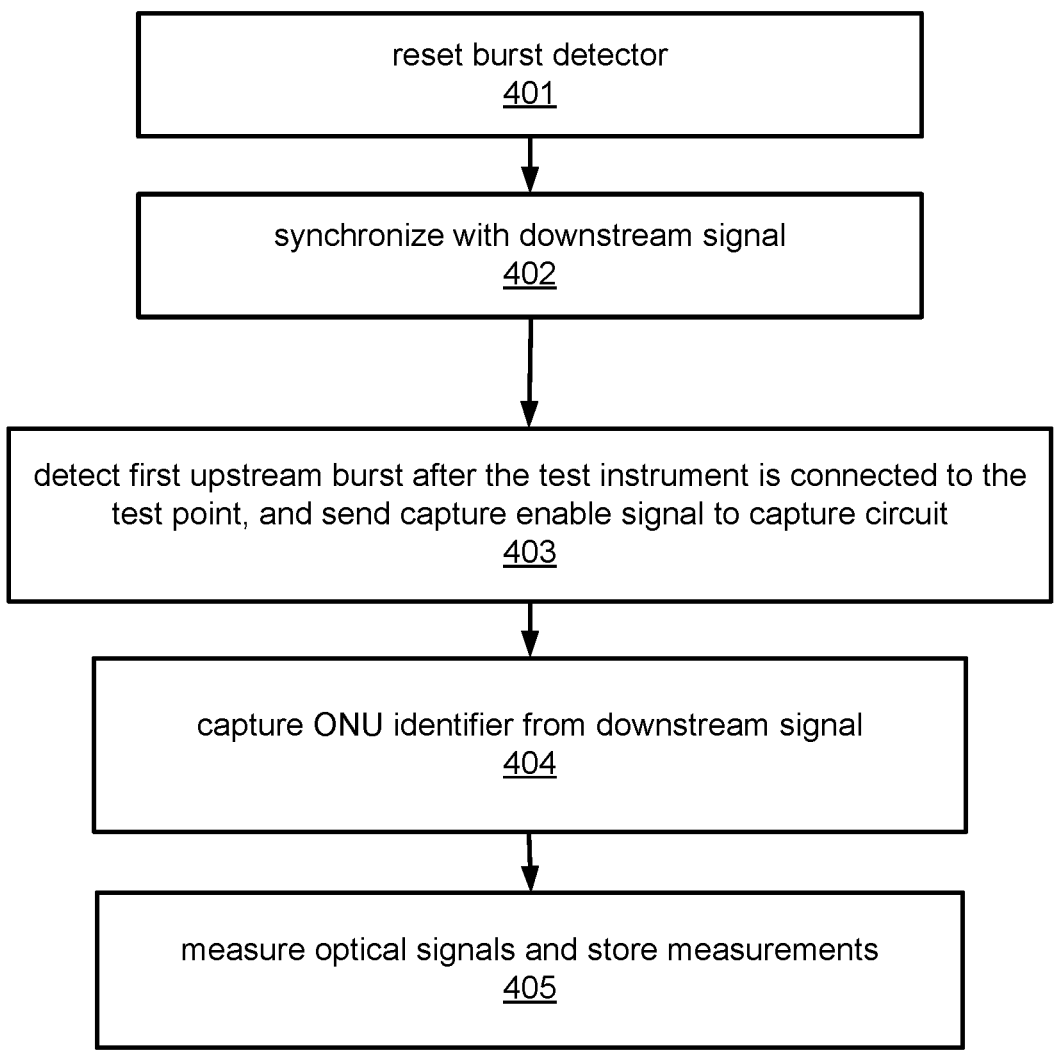
FIG. 4 illustrates a method of capturing an ONU identifier, according to an example of the present disclosure.

FIG. 4 shows a method 400 that may be performed by the test instrument 100. Steps of the method 400 and other methods described herein may be performed in orders other than shown and described or at the same time. The method 400 is described by way of example with respect to FIG. 3. For example, the test instrument 100 is connected at test point 105 in ODN 101. The ONU 103 enters into an activation process according to a communications standard, an example of which is described with respect to FIGS. 5 and 6. The activation process may be initiated in response to connecting the ONU 103. For example, connecting the test instrument 100 to the test point 105 causes the ONU 103 to be disconnected and re-connected to the ODN 101, initiating the activation process.

At 401, the burst detector 352 is reset for example by the processor 350. When the burst detector 352 is reset, the burst detector 352 may not send a capture enable signal to the capture circuit 320 or the capture enable signal is set to a value indicating that the capture circuit 320 is not enabled to capture information from downstream signals. The processor 350 may reset the burst detector 352 for example when the processor determines the test instrument 100 is initially connected to the test point 105 and prior to receiving an upstream signal from the ONU 103. The processor 350 may send a signal to the burst detector 352 to reset. The test instrument 100 may not include a burst detector 352 and in that case any steps involving the burst detector 352 are not performed.

At 402, the test instrument 100 synchronizes with received downstream signals 110 in order to receive data sent from the OLT 102. At 403, the burst detector 352 detects a first upstream burst after the test instrument 100 is connected to the test point 105, and sends capture enable signal to the capture circuit 320. For example, the first upstream burst, which may include a message sent upstream from the ONU 103 to the OLT 102 during an activation procedure, indicates that the ONU 103 has currently started its activation process. The capture circuit 320 is enabled to capture data from downstream signals 110 from the OLT 102.

At 404, the capture circuit 320 captures the ONU identifier sent in the downstream signals 110 from the OLT 102 after being enabled. For example, the capture circuit 320 receives a digital data stream from the downstream receiver 306, identifies an OLT message including an identifier of the ONU from the digital data stream, and stores bytes of the OLT message, including the identifier of the ONU, in the data storage 351. An OLT message may include a header and payload, and is transmitted from the OLT 102 downstream in the ODN 101 to one or more ONUs. The capture circuit 320 is to start and stop storing data based on conditions derived from at least one of data patterns found in the digital data stream which may identify a message containing the ONU identifier, the burst detector 352 detecting an upstream signal transmitted from the ONU, and signals from the processor 350.

Also, at 405, the optical signals received at the test instrument 100 may be measured and stored. For example, power levels of the downstream signals 110 are measured by the power meter 313 and stored in the data storage 351 and may be displayed via the user interface 321.

The test instrument 100 can test for multiple ONUs at a single test point. For example, referring to FIG. 2, the test instrument 100 is connected at TP2. The method 400 is performed to determine the ONU identifiers for ONUs 203a-n downstream from TP2 from downstream signals 110 sent from the OLT 202. The capture circuit 320 may stop capturing information from messages from the OLT after a predefined number of messages are captured, after a predefined time interval, and/or after some other messages are received that may indicate the activation process is completed.

Figure 5A:
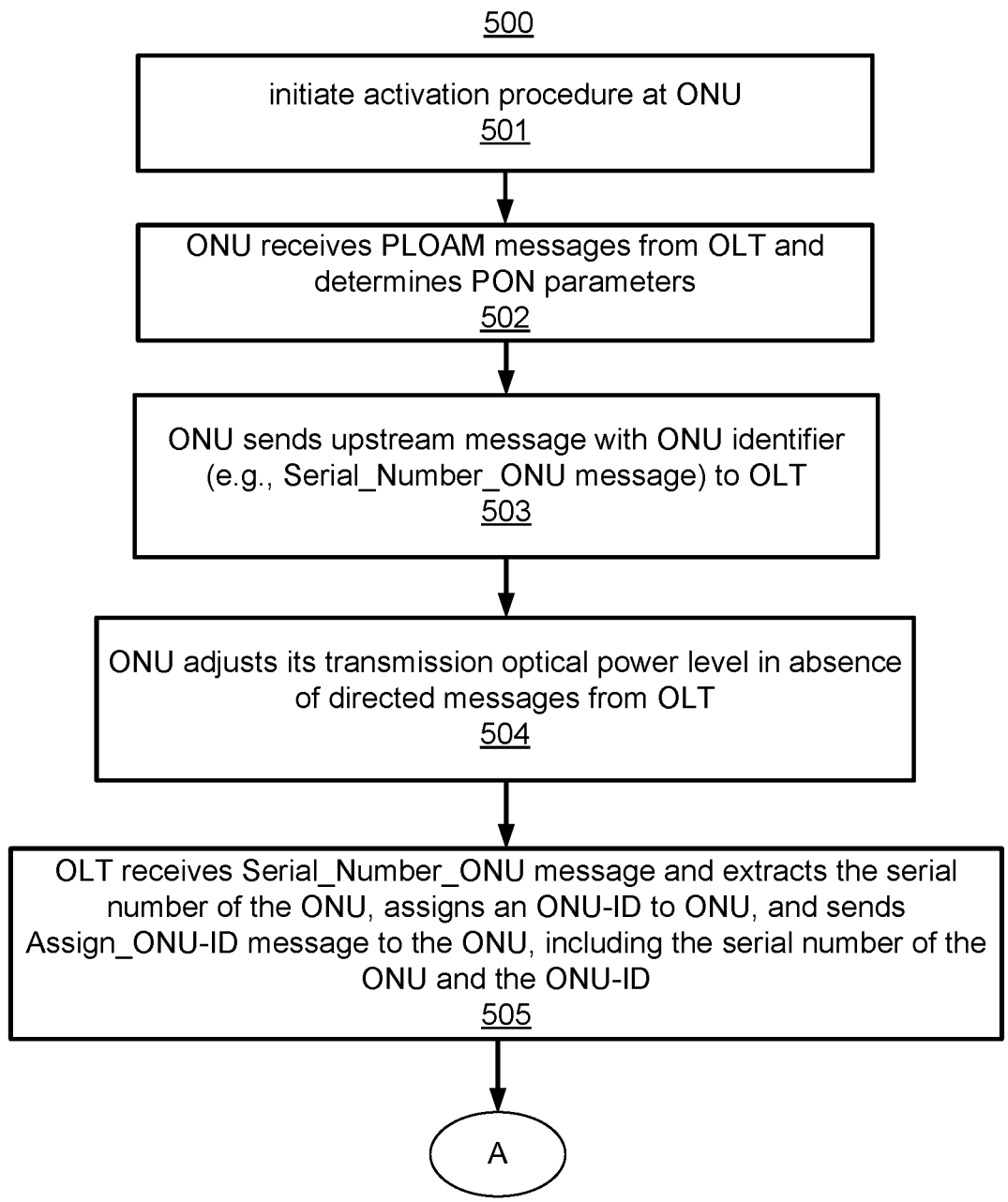
FIGS. 5A-B illustrate a method of capturing an ONU identifier during an activation procedure, according to an example of the present disclosure.
Figure 5B:
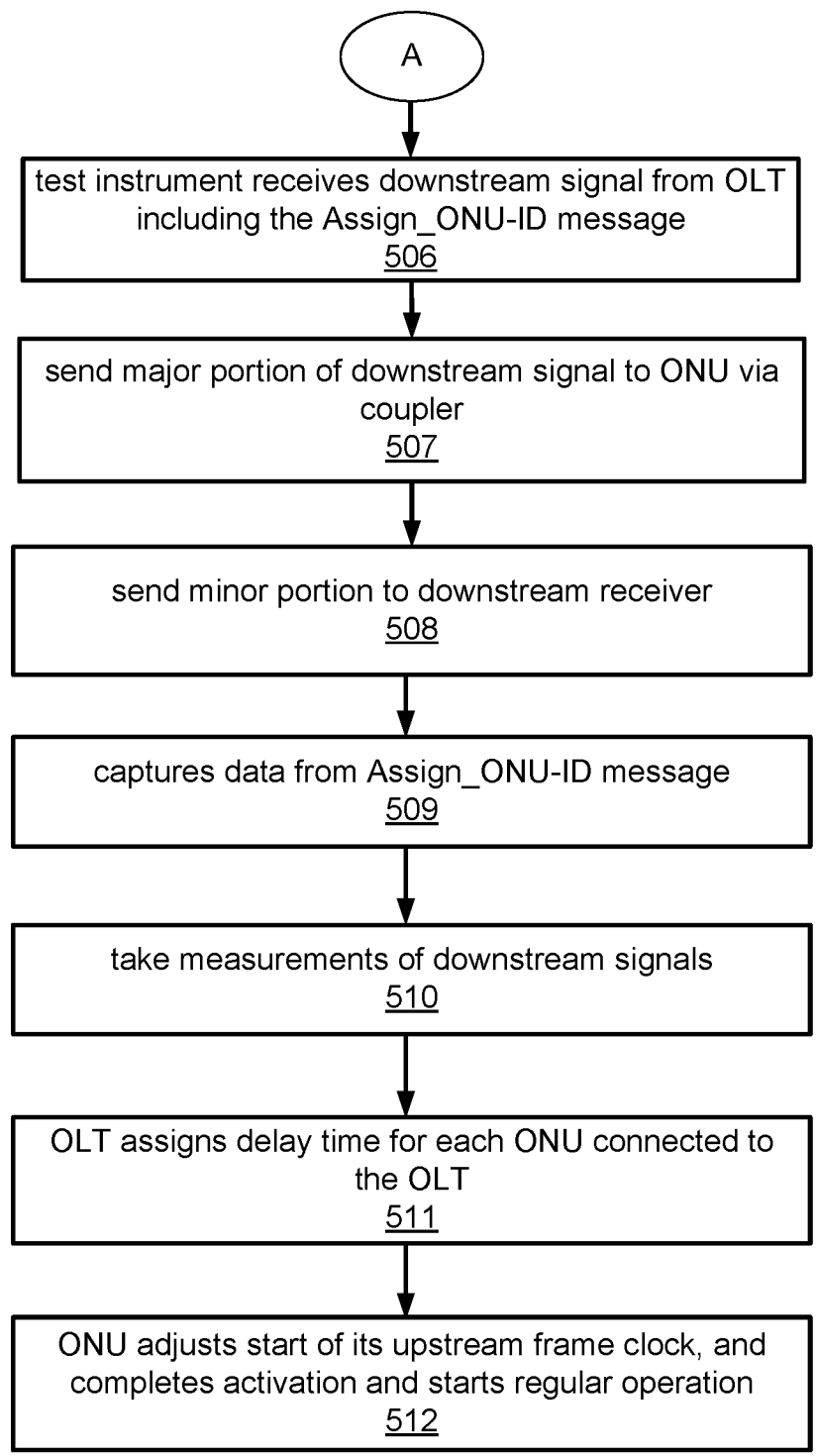

As discussed above, the ONU identifier may be extracted from downstream messages from the OLT during an activation procedure of the ONU. An ONU may communicate with the OLT according to a communication standard which sets forth the message exchange between the OLT and ONU during the activation procedure. According to an example, the communication standard may include the ITU-T G.984.3 communication standard for a gigabit-capable passive optical network (G-PON): Transmission convergence layer specification. The message exchange between the OLT and OLU during the activation procedure according to the G.984.3 communication standard includes the exchange of physical layer operation and maintenance (PLOAM) messages. FIGS. 5A-B show a method describing the G-PON activation procedure in conjunction with steps of the method 400 performed by the test instrument 100 to determine ONU identifiers from downstream signals 110. The method 500 is described by way of example with respect to the test instrument 100 shown in FIGS. 1 and 3. Upstream and downstream messages sent between the ONU 103 and the OLT 102 pass through the test instrument 100 after the test instrument 100 is connected at the test point 105. Also, the test instrument 100 can measure power levels and other signal parameters of the upstream signals 111 and downstream signals 110 passing through the test instrument 100. The method 500 does not include steps performed by the burst detector 352, but the method 500 may include those steps as described in the method 400.

At 501, the activation procedure is initiated in the ONU 103, for example, in response to the ONU 103 being re-connected to the ODN 101 when the test instrument 100 is connected at test point 105. Upon entering the activation procedure, the ONU 103 waits for a broadcast from the OLT At 502, the ONU 103 receives an Upstream_Overhead PLOAM message, optionally followed by an Extended_ Burst_Length PLOAM message periodically issued by the OLT 102, and determines PON operating parameters (e.g., the lengths and patterns of the burst mode overhead components, value of the pre-assigned delay, and initial optical power level) from the received PLOAM messages.

At 503, the ONU 103 sends an upstream message to the OLT 102 including its serial number (e.g., Serial_Number_ONU message) in response to a broadcast serial number request message received from the OLT 102.

At 504, the ONU 103 adjusts its transmission optical power level using the absence of directed messages from the OLT as a negative acknowledgment.

At 505, the OLT 102 receives the Serial_Number_ONU message and extracts the serial number of the ONU 103 and assigns an ONU-ID to it and sends an Assign_ONU-ID message to the ONU 103, including the serial number of the ONU and the ONU-ID assigned by the OLT 102.

Bytes of the Assign_ONU-ID message are shown in FIG. 6. Byte 2 includes a pattern of bits that indicates that the message is an Assign_ONU-ID message. Byte 3 includes the ONU-ID and bytes 4-11 include the serial number of the ONU 103.

At 506, the test instrument 100 receives a downstream signal from the OLT 102 including the Assign_ONU-ID message on optical port 1. At 507, the test instrument sends a major portion of the downstream signal to the ONU 103 via optical coupler 304 and optical port 2. The major portion for example is shown in FIG. 3 as DS 80%. At 508, a minor portion of the downstream signal is dropped via drop port 342 and sent to the downstream receiver 306. At 509, the capture circuit 320 captures the data in the Assign_ONU-ID message, including the ONU-ID and the ONU serial number in bytes 3-11 of the message. The data is stored in the data storage 351. Determining when to start and stop capturing data from the downstream signal may be based on conditions derived from at least one of data patterns found in the digital data stream (e.g., data patterns identifying the Assign_ONU-ID message), signals from the burst detector 352, and signals from the processor 350. At 510, measurements of the downstream signal are performed and stored in the data storage 351.

At 511, the OLT 102 assigns delay time for each ONU connected to the OLT 102 via the ODN 101 so different propagation delays are equalized. At 512, the ONU 103 adjusts the start of its upstream frame clock based on its assigned equalization delay, and the ONU 103 completes activation and starts regular operation.

During the activation procedure, the ONU 103 may go through various states. In an initial state, the ONU 103 is powered up, and in a standby state, the ONU 103 is waiting for the PON parameters from the OLT 102. In a serial number state, the ONU 103 makes itself known to the OLT 102 by sending its serial number to the OLT 102 and the ONU 103 receives the Assign_ONU-ID message with the ONU identifiers. In a ranging state, the ONU 103 synchronizes its upstream frame clock based on its assigned equalization delay. The ONU identifiers, such as the ONU-ID and the ONU serial number, may be captured from the downstream signals 110 from the OLT 102 in the serial number state.

ONU identifiers may be captured from downstream signals transmitted from an OLT when communications standards other than the GPON communications standards are implemented in the PON. ONU identifiers may be captured from downstream signals for any communications standard that includes transmission of downstream messages that include ONU identifiers.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. An apparatus connectable to an optical network, the apparatus comprising:
   a plurality of optical ports connectable to the optical network to optically couple the apparatus between an optical line terminal (OLT) and an optical network unit (ONU) in the optical network;
   an optical receiver coupled to the plurality of optical ports, wherein the optical receiver is to receive a downstream signal transmitted from the OLT via a first port of the plurality of optical ports and convert the downstream signal to a digital data stream;
   a burst detector to:
     detect upstream signals from the ONU, and
     generate a capture enable signal for output, wherein the capture enable signal is set to a value for enabling capture of information from the downstream signal; and
   a capture circuit to:
     receive the digital data stream from the optical receiver,
     extract an ONU identifier from an OLT message from the digital data stream, and
     store bytes of the OLT message in data storage based on actions by the burst detector, wherein the OLT message comprises the ONU identifier obtained from the ONU identifier assignment message.

2. The apparatus of claim 1 comprising:
   an optical coupler including a plurality of coupler ports and a plurality of drop ports, wherein the downstream signal is received on a first coupler port of the plurality of coupler ports, and the coupler is to output a major portion of the downstream signal power via a second coupler port of the plurality of coupler ports and output a minor portion of the downstream signal power to a downstream data receiver via a first drop port of the plurality of drop ports.

3. The apparatus of claim 2, wherein the second coupler port is coupled to a second optical port of the plurality of optical ports, and the second optical port is connected to the ONU, and wherein the major portion of the downstream signal power is output to the ONU via the second optical port.

4. The apparatus of claim 3, wherein the apparatus is to receive an upstream signal sent from the ONU to the OLT via the second optical port, and the coupler is to receive the upstream signal via the second coupler port, and the coupler is to output a major portion of the upstream signal power via the first coupler port and output a minor portion of the upstream signal power via a second drop port of the plurality of drop ports.

5. The apparatus of claim 4, comprising:
a burst detector coupled to the dropped minor portion of the upstream signal power, wherein the burst detector is to output the capture enable signal to the capture circuit in response to detecting the upstream signal.

6. The apparatus of claim 1, wherein the capture circuit is to start and stop storing the digital data stream to the data storage based on conditions derived from at least one of data patterns found in the digital data stream, a burst detector detecting an upstream signal transmitted from the ONU, and signals from a processor.

7. The apparatus of claim 1, comprising:
a power meter to measure power levels of at least one of the downstream signal and an upstream signal received from the ONU via one of the plurality of optical ports.

8. The apparatus of claim 1, wherein the apparatus is coupled upstream of an optical splitter combiner in the optical network, and the optical splitter combiner is coupled to a plurality of ONUs, wherein the capture circuit is to capture an identifier for each of the ONUs from downstream signals sent from the OLT to each of the ONUs.

9. The apparatus of claim 1, wherein the ONU identifier includes an ONU serial number, and the OLT message including the ONU identifier is received from the OLT during an activation procedure of the ONU.

10. A test instrument connectable to an optical distribution network (ODN) of a passive optical network between an optical line terminal (OLT) and at least one optical network unit (ONU), the test instrument comprising:
optical ports coupling the test instrument to a test point in the ODN between the OLT and the at least one ONU;
at least one receiver including a measurement circuit to measure parameters of optical signals received via at least one of the optical ports, wherein the optical signals include a downstream signal transmitted from the OLT to the at least one ONU via the ODN;
at least one detector to:
detect upstream signals from the ONU; and
generate a capture enable signal for output, wherein the capture enable signal is set to a value for enabling capture of information from the downstream signal; and
at least one capture circuit coupled to the at least one receiver, and the capture circuit is to:
receive the downstream signal from the at least one optical receiver, and
extract an ONU identifier of the at least one ONU from an ONU identifier assignment message from the downstream signal, and
store the ONU identifier in data storage based on actions of the at least one detector.

11. The test instrument of claim 10, wherein the at least one receiver comprises a plurality of downstream receivers to receive downstream optical signals for different passive optical networks.

12. The test instrument of claim 11, wherein the at least one receiver comprises a plurality of upstream receivers to receive upstream optical signals for the different passive optical networks.

13. The test instrument of claim 10, comprising:
an optical coupler coupling the optical ports to each other and the at least one receiver,
wherein the optical coupler is to receive the downstream signal from a first of the optical ports, output a major portion of the downstream signal power to a second of the optical ports connected to the at least one ONU, and output a minor portion of the downstream signal power to the at least one receiver via a drop port of the coupler, and the measurement circuit measures the parameters from the minor portion.

14. The test instrument of claim 10, comprising:
a processor; and
a display, wherein the processor is to present, on the display, the measured parameters or the identifier of the at least one optical network unit (ONU).

15. The test instrument of claim 10, wherein the at least one ONU comprises a plurality of ONUs connected downstream from the test point in the ODN, and the capture circuit is to capture an ONU identifier for each of the plurality of ONUs.

16. A method comprising:
receiving, via an optical port of a test instrument, a downstream optical signal transmitted from an optical line terminal (OLT), wherein the test instrument is connected to an optical distribution network (ODN) between the OLT and an optical network unit (ONU);
extracting an ONU identifier from an OLT message from the downstream optical signal;
detecting one or more upstream signals from the ONU;
generating a capture enable signal for output; and
storing bytes of the OLT message in data storage based on the detected upstream signals, wherein the OLT message comprises the ONU identifier obtained from an ONU identifier assignment message.

17. The method of claim 16, wherein capturing the identifier of the ONU comprises:
detecting, at the test instrument, an upstream signal transmitted from the ONU to the OLT via the ODN during an activation procedure of the ONU; and
enabling a capture circuit in the test instrument to capture the identifier from in response to detecting the upstream signal.

18. The method of claim 17, wherein capturing the identifier in response to detecting the upstream signal comprises:
capturing the identifier from a first received downstream signal received after the upstream signal is detected.

19. The method of claim 16, wherein capturing the identifier of the ONU from the downstream optical signal comprises:
power splitting the received downstream optical signal:
converting a minor portion of the split optical signal to a digital data stream; and
extracting bytes from the digital data stream that include the identifier of the ONU.

20. The method of claim 16, wherein the identifier of the ONU is captured during an activation procedure of the ONU.

21. A non-transitory method computer-readable storage medium having an executable stored thereon, which when executed, instructs a processor to perform the following:

receiving, via an optical port of a test instrument, a downstream optical signal transmitted from an optical line terminal (OLT), wherein the test instrument is connected to an optical distribution network (ODN) between the OLT and an optical network unit (ONU);

extracting an ONU identifier from an OLT message from the downstream optical signal;

detecting one or more upstream signals from the ONU;

generating a capture enable signal for output; and storing bytes of the OLT message in data storage based on the detected upstream signals, wherein the OLT message comprises the ONU identifier obtained from an ONU identifier assignment message.

* * * * *